United States Patent [19]
Ocampo et al.

[11] Patent Number: 5,936,705
[45] Date of Patent: Aug. 10, 1999

[54] PATTERN FOR COLOR MODIFYING CONTACT LENS

[75] Inventors: Gerardo J. Ocampo, Bridgeview; Barry L. Atkins, Chicago, both of Ill.

[73] Assignee: Wesley Jensen Corporation, Des Plaines, Ill.

[21] Appl. No.: 08/829,302

[22] Filed: Mar. 31, 1997

[51] Int. Cl.⁶ .................................................. G02C 7/04
[52] U.S. Cl. .................. 351/162; 351/160 R; 351/160 H
[58] Field of Search ................ 351/162, 160 R, 351/160 H, 177; 264/1.7

[56] References Cited

U.S. PATENT DOCUMENTS

| | | | |
|---|---|---|---|
| 4,582,402 | 4/1986 | Knapp | 351/162 |
| 5,018,849 | 5/1991 | Su et al. | 351/162 |
| 5,116,112 | 5/1992 | Rawlings | 351/162 |
| 5,120,121 | 6/1992 | Rawlings et al. | 351/162 |
| 5,160,463 | 11/1992 | Evans et al. | 351/162 |
| 5,302,978 | 4/1994 | Evans et al. | 351/162 |
| 5,414,477 | 5/1995 | Jahnke | 351/162 |

FOREIGN PATENT DOCUMENTS

0 472 496 A2   2/1992   European Pat. Off. .

*Primary Examiner*—Georgia Epps
*Assistant Examiner*—Jordan M. Schwartz
*Attorney, Agent, or Firm*—Brinks Hofer Gilson & Lione

[57] ABSTRACT

A color modifying contact lens having an iris pattern having color elements that surround a non-opaque pupil section, wherein the pattern comprises three annular regions: an inner region, an intermediate region, and an outer region. The inner and outer regions each comprise a population of color elements effective to enhance or modify the wearer's eye color as observed by the ordinary viewer. The intermediate region has an area of between about 25–72%, and comprises a population of color elements that covers between about 5–30% of the area within the intermediate region. The color elements in the intermediate region form an array of substantially radial macro-striations that alternate between those having color elements and those without color elements.

33 Claims, 3 Drawing Sheets

PATTERN FOR COLOR MODIFYING CONTACT LENS

BACKGROUND OF THE INVENTION

This invention relates to a colored contact lens that can enhance or modify the color of the wearer's eye, while providing a very natural appearance.

Early attempts to provide a contact lens that can enhance or modify the color of the wearer's eye suffered various shortcomings. Lenses that provided a transparent tint over the iris were not able to change dark eye colors to light colors, and provided a bland appearance. Lenses that provided a continuous opaque pattern over the iris looked unnatural. Lenses that provided an opaque pattern based on photographic or artistic reproduction of the iris were expensive to make. Such lenses also reduced the amount of oxygen that is transmitted through the lens.

Commercial success was achieved by the colored contact lens described in U.S. Pat. No. 4,582,402 to Knapp. The Knapp color contact lens was achieved by printing an intermittent pattern of opaque ink dots over the area of the contact lens that covers the iris. Although the intermittent pattern of dots does not fully cover the iris, it provides a sufficient density of dots such that a masking effect that gives the appearance of a continuous color is observed by the ordinary viewer. Thus, the intermittent dot pattern is able to provide a sufficient appearance of continuity to effectively and substantially modify the wearer's eye color, such as from brown to blue. At the same time, the intermittent pattern allows oxygen to pass through the interstices between the dots. Such contact lenses now comprise a significant share of the contact lens market.

Various efforts have been made to improve upon the success of the Knapp lens. U.S. Pat. No. 5,414,477 to Jahnke discloses the application of the intermittent ink pattern in two portions of two distinct shades of colorant to provide a more natural appearance. However, adding two shades of colorant requires two applications of colorants. This adds to the cost of producing a lens, and increases the number of lenses rejected during the lens manufacturing process.

Jahnke also claims a pattern that comprises three concentric portions, wherein the first and third portions have opaque coloring, while the second portion is non-opaque. However, this lens has not achieved consumer acceptance.

U.S. Pat. No. 5,120,121 to Rawlings et al. discloses a cluster of interconnecting lines radiating from the periphery of the pupil portion to the periphery of the iris portion. FIG. 2 in Ciba-Geigy European Patent Publication No. 0 472 496 A2 shows a contact lens having a pattern of lines that attempts to mimic the lines found in the iris.

Despite these efforts, the contact lens industry continues to seek a low-cost, colored lens that can enhance or modify the eye color, while providing the depth and texture that is inherent in the iris.

SUMMARY OF THE INVENTION

The inventors have discovered a contact lens that enhances or modifies a wearer's eye color, while it adds depth and texture to the perceived eye appearance. At the same time, this contact lens does not cost significantly more to produce than current colored contact lenses.

Surprisingly, such a lens was achieved by providing an iris pattern of color elements that surrounds a non-opaque pupil section, wherein the pattern comprises three annular regions: an inner region, an intermediate region, and an outer region. The inner and outer region each comprise a population of color elements effective to enhance or modify the wearer's eye color as observed by the ordinary viewer. The intermediate region has an area of between about 25–72% of the iris pattern, preferably about 47%. The intermediate region also comprises a population of color elements that covers between about 5–30% of the intermediate region area, preferably between about 10–20%. The color elements in the intermediate regions form an array of radial macro-striations that alternate between those having color elements and those without color elements. Preferably, the macro-striations form an irregular array.

DETAILED DESCRIPTION OF THE INVENTION

In the context of this invention, although some terms are referred to in the singular, it is understood that such references may also encompass the plural. For example, although color is referred to in the singular, it is understood that some colors comprise different color components.

Further, it is understood that the term "eye color" refers to the color of the iris. Furthermore, the term "ordinary viewer" means a person having normal 20/20 vision standing about 5 feet from a person wearing the lens of this invention. Moreover, the percentages in the formulations are based on weight percentages unless otherwise specified. However, for the population of color elements within a region, percent refers to the portion of the total area within the region covered by the color elements as measured by an image analyzer known in the art such as a BAUSCH & LOMB OMNICON 5000™ calibrated against a known standard. Finally, all references cited herein are incorporated by reference.

This invention uses a pattern of color elements with a contact lens to enhance or modify the natural color of the wearer's eye. At the same time, the pattern also provides a more natural appearance by adding texture and depth to the iris as perceived by the ordinary viewer.

The colored contact lens of this invention has a non-opaque pupil section and an iris pattern of color elements. The pattern comprises an annular intermediate region that constitutes between about 25–72% of the area of the iris pattern. Preferably, the intermediate region constitutes about 30–60% of the pattern, most preferably about 47%. The intermediate region also comprises a population of color elements that covers between about 5–30% of intermediate region area, preferably about 10–20%, most preferably about 15%. The color elements in the intermediate regions form an array of substantially radial macro-striations that alternate between those having color elements and those substantially without color elements.

The iris pattern having an intermediate region of substantially radial macro-striations is distinguishable from the prior art in that it allows the natural iris color to overcome the masking effect of the iris pattern color within the intermediate region. Accordingly, the natural iris color combines with the iris pattern color to provide a complementary effect. Further, because these color sources reside at different depths, the combination also provides depth and texture to the enhanced or modified appearance.

The pattern also comprises an inner region and an outer region, each having populations of color elements effective to enhance or modify a wearer's eye color. Such populations cover between about 35–85% of each region. More preferably, the color elements in the inner and outer regions cover about 40–50% of the total area of the respective regions. Most preferably, the density of the color elements vary in a manner effective to mimic the pattern of the iris.

Figure 1:
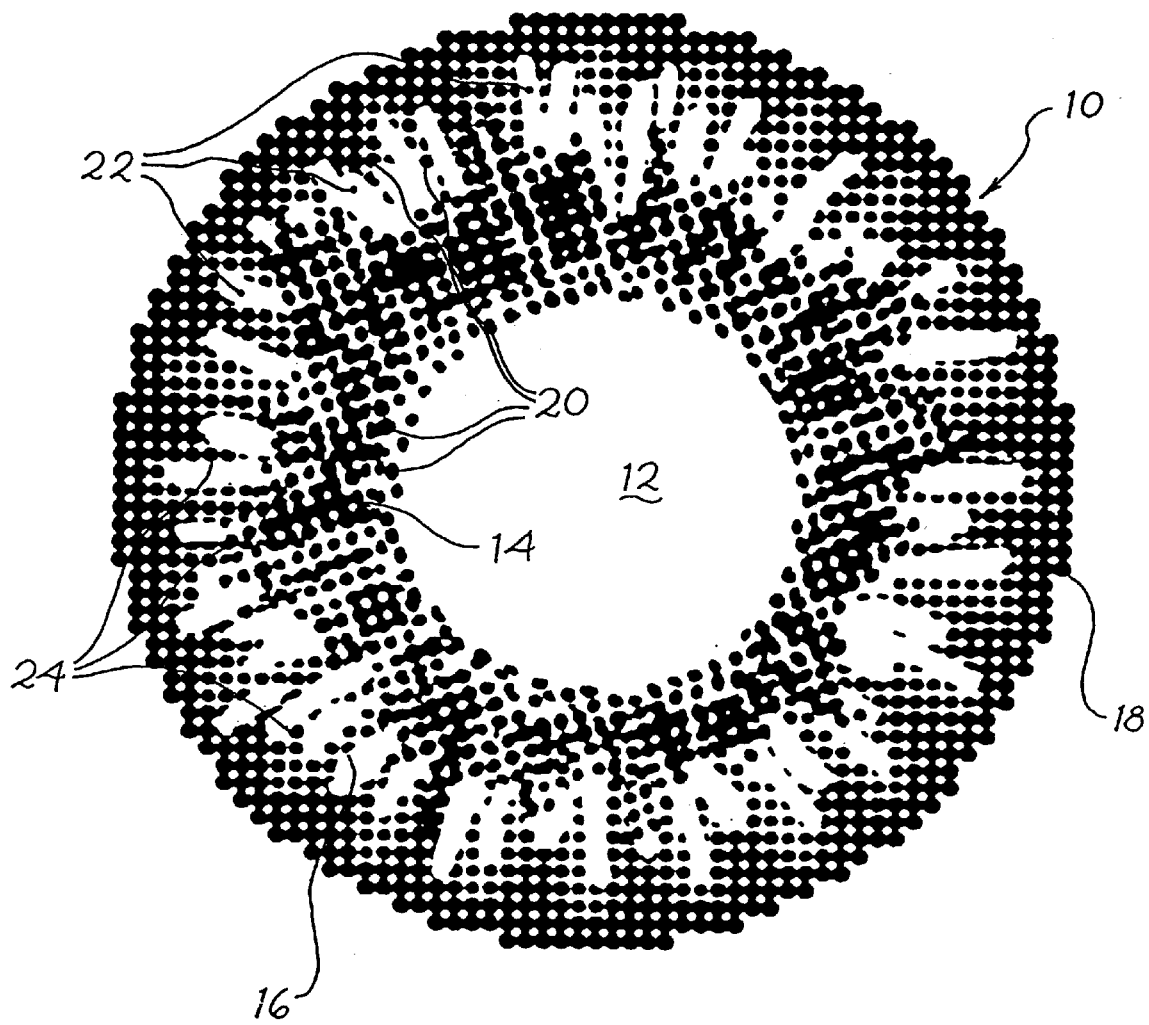
FIG. 1 is a plain view of a preferred iris pattern of the contact lens. On a contact lens, the pupil section is the center region having no color elements. If the contact lens has a sclera section, it would surround the periphery of the iris pattern.

FIG. 1 is a plain view of a preferred pattern 10 used in the contact lens (not shown) of the present invention. The pupil section 12 is the inner portion of the pattern that has no color elements and is not considered part of the pattern. Pattern 10 circumscribes pupil section 12 and comprises three concentric annular regions. An inner region 14 is located on the periphery of pupil section 12. An intermediate region 16 is located on the outer periphery of inner region 14. Finally, an outer region 18 is located on the outer periphery of intermediate region 16.

Pattern 10 also comprises a population of color elements, some of which are labeled as 20. As seen in FIG. 1, the color elements can take many different shapes, and are arranged in a pseudo-random order. Some of the elements are circular dots in a grid pattern, while others are irregularly-shaped, free-standing bits. In some cases, it is preferable to allow the elements to clump into larger color elements. Although not shown, the color elements can also take specifically defined shapes, such as circles, hexagons or squares, and can also be arranged in a regular grid pattern.

In the areas populated by color elements, and when the area covered by each element is measured by approximating a circle, the color elements have, on the average, a preferable diameter of about 0.1 mm. Moreover, the distance between the center of the color elements are, on the average, preferably about 0.13 mm apart. However, as noted above, the density of the color elements can vary to mimic the iris pattern. Accordingly, the diameter is preferably increased in areas of higher density and decreased in areas of lower density. Alternatively or additionally, the distance between color elements can decrease in areas of higher density, and increase in areas of lower density. In the most preferred embodiment, the size and spacing of a portion of the color elements are large enough and close enough to form a single larger element.

Region 16 in FIG. 1 shows the population density of the color elements that forms the substantially radial macro-striations that alternate between areas having color elements, and areas having substantially no color elements. The array can be regular, such as the spokes on a wheel. However, in a more preferred embodiment, the color elements comprise a substantially radial, pseudo-random array of macro-striations that irregularly alternate between macro-striations having color elements 24 and macro-striations having substantially no color elements 22.

The aspect ratio of the macro-striations can vary from between about 1 to 7. However, as shown in FIG. 1, some of the macro-striations may overlap to form nonlinear designs. In a preferred embodiment, the non-opaque macro-striations are substantial cylinders with rounded ends that vary between about 1 to 3 color elements wide and 1–7 color elements long. The preferred cylinder will average about 1.5 color elements wide and 3.5 color elements long.

In a most preferred embodiment, each color element in pattern 10 is the same color. This negates the need for multiple applications of color elements. However, patterns having color elements of different colors are embraced within the scope of the present invention.

In FIG. 1, one may note that approximately two rows of color elements in the inner periphery of region 14 are less densely populated than other portions of region 14. Therefore, in this case, it is possible to claim that pattern 10 comprises four concentric regions. Regardless of whether the first two rows are considered a separate region or part of the inner region, the pattern still comprises an intermediate annular region between an inner region and an outer region as embraced within the scope of this invention.

Figure 2:
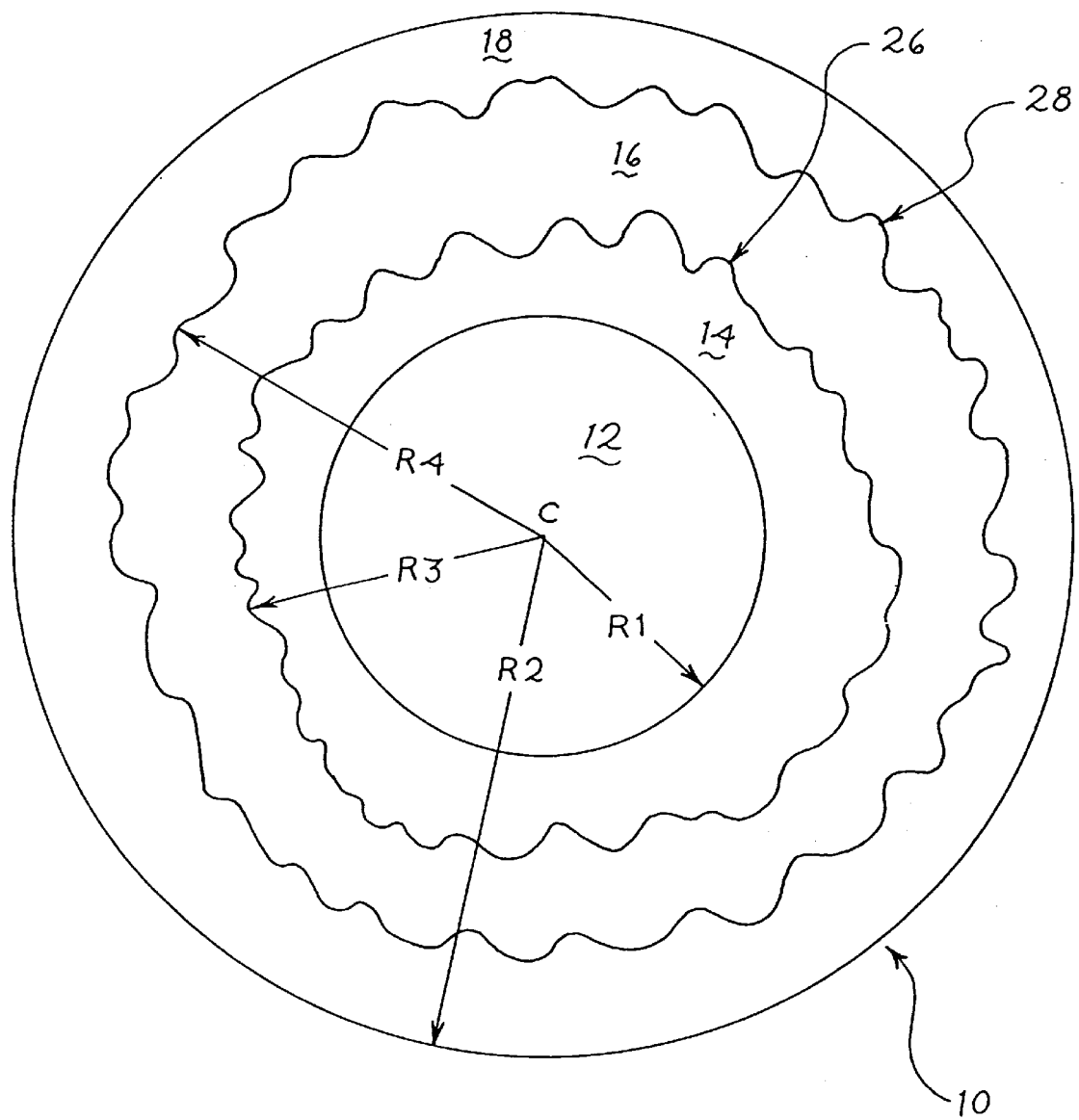
FIG. 2 graphically represents three regions of the iris pattern, and depicts two preferred jagged borders among the three regions.

FIG. 2 graphically represents pattern 10 comprising the three annular, concentric regions. The average eye has an average pupil radius, r1, of between about 2 mm to 2.5 mm. This distance also defines the inner periphery of the iris. The outer periphery of the average iris has a radius, r2, of about 5 mm to 7 mm. Correspondingly, on a contact lens, r1 is between about 2.2 to 2.6 mm, preferably about 2.5 mm, while r2 is about 5.2 to 6.8 mm, preferably about 5.75 mm. As shown in FIG. 2, borders 26 and 28 are jagged in an irregular pattern. However, borders 26 and 28 can each be a substantially smooth, circular curve or have a repetitive jagged pattern (not shown).

In FIG. 1, regions 14 and 18 appear to overlap within region 16. This is due to the formation of a substantially radial array of macro-striations between borders 26 and 28 by the color elements in intermediate region 16.

Border 26 in FIG. 2 defines the outer periphery of regions 14, and the inner periphery of region 16. It is defined by the inner radius, r3, of the intermediate region 16. When border 26 is a substantially circular curve, r3 is between about 3.3–3.7 mm, preferably about 3.5 mm. When border 26 is a jagged transition, r3 averages between about 3.3–3.7 mm, preferably about 3.5 mm, and can vary substantially in the peaks and valleys of the border, preferably between about ±0.2 mm.

Border 28 of FIG. 2 is defined as the outer periphery of region 16, and the inner periphery of region 18. It is defined by the outer radius, r4, of the intermediate region 16. As a substantially circular curve, r4 is between about 4.8–5.2 mm, preferably about 5.0 mm. In the jagged pattern shown in FIG. 1, r4 averages between about 4.8–4.6 mm, preferably about 5.0 mm, and can vary substantially in the peaks and valleys of border 28, preferably between about ±0.2 mm.

Figure 3:
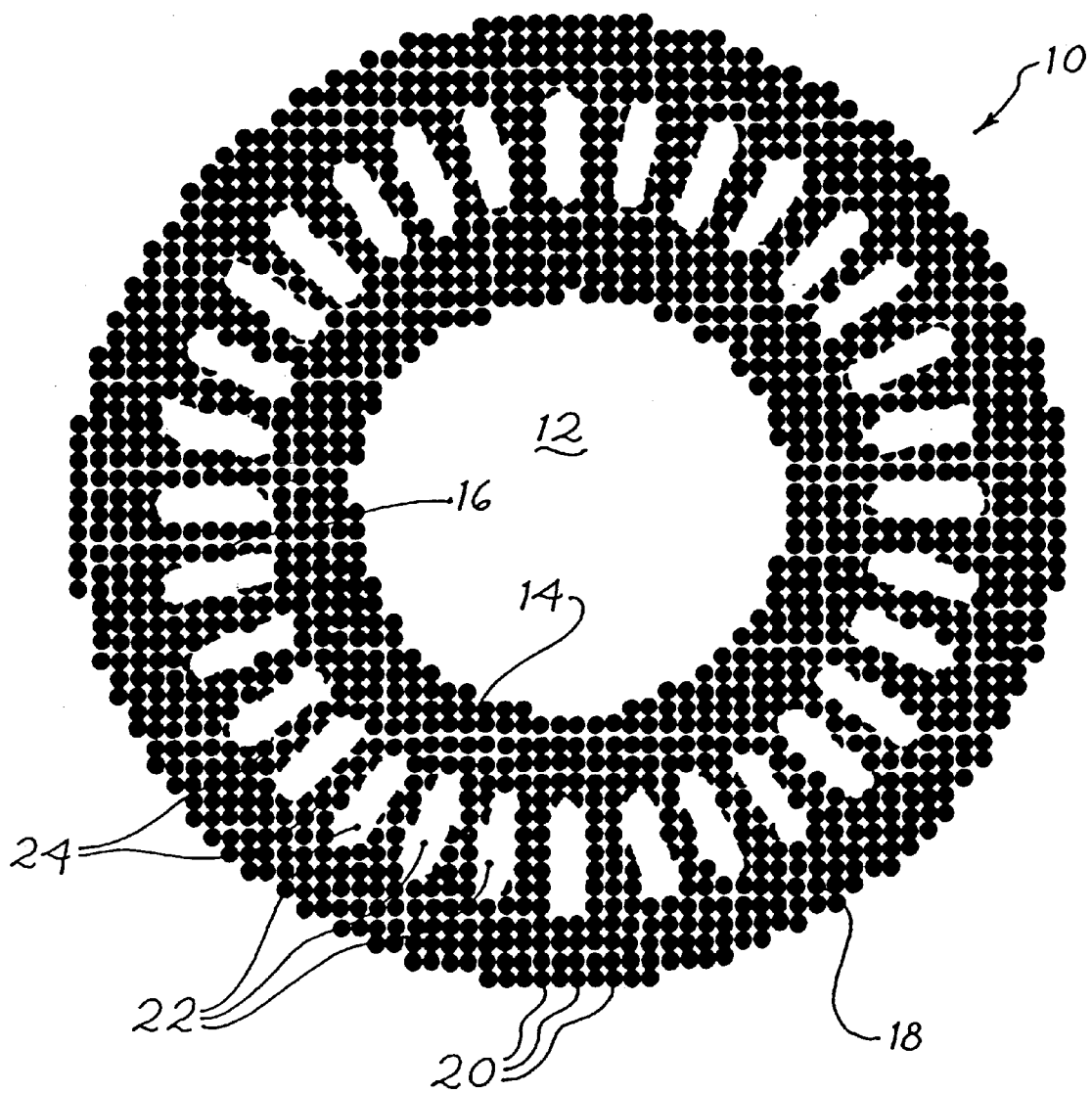
FIG. 3 is a plain view of an iris pattern in which the pattern is not irregular.

FIG. 3 is a plain view of an alternative iris pattern in which the borders, the color elements and the macro-striations form a substantially regular pattern. Note that the borders between the inner, intermediate and outer regions are substantially smooth and circular, and that the macro-striations form a regular radial array.

Irrespective of the contact lens used, the colors used, or whether the colors are applied on or formulated within the contact lens, the invention is directed towards the color pattern. Details such as the formulation and production of the color elements, the formulation and production of the contact lenses and the methods of incorporating color elements with the contact lenses are known to artisans of the contact lens industry.

The preferred color elements are dots as taught in U.S. Pat. Nos. 4,582,402 to Knapp and 5,414,477 to Jahnke. However, in the context of this invention, the dots need not be opaque. For dark eyes, the dots are preferably opaque dots. For light eyes, the dots can be either opaque or non-opaque.

Formulations of the most preferred ink pastes are:

| Ingredient | Color Green | Blue | Aqua | Violet |
| --- | --- | --- | --- | --- |
| Ethyl Lactate | 31.35% | 22.50% | 22.50% | 22.50% |
| Polymer Soln. | 65.33% | 76.00% | 76.01% | 76.00% |
| PCN Blue | — % | 1.50% | 0.29% | — % |
| PCN Green | 0.90% | — % | 1.20% | — % |
| Carbazole Violet | — % | — % | — % | 1.50% |
| Hydrophobic FeO | 2.42 | — % | — % | — % |
| Total | 100.00% | 100.00% | 100.00% | 100.00% |

To produce the preferred ink paste, the ingredients are mixed in a grinding media. For 651 gram and 3000 gram samples of ink paste, 850 grams and 4298 grams of grinding media are used, respectively. The target viscosity of the polymer solutions are about 35,000 CPS for each formulation, except for the green color which has a target viscosity of about 50,000 CPS.

This pattern can be applied to a variety of contact lenses, on the anterior (away from eye) or posterior (in contact with eye) surface, or formulated within the contact lens. In a preferred lens the pattern is applied to the anterior surface. On a hard contact lens, the outer periphery of the pattern lies at substantially the edge of the contact lens. On a soft contact lens, the outer periphery of the pattern may be surrounded by a non-opaque sclera section. The preferred contact lenses are disclosed in U.S. Pat. Nos. 4,405,773 and 4,668,240 both to Loshaek. The preferred lenses used with the inventive pattern are substantially clear and colorless. However, lenses that have a slight tint are embraced within the invention, provided the tint does not substantially alter the appearance imparted by the color elements when viewed by the ordinary observer.

Methods of making contact lenses that have a color pattern are known to the ordinary artisan. The preferred methods of producing contact lenses having the pattern of the present invention are described in U.S. Pat. Nos. 4,582,402 to Knapp and 5,414,477 to Jahnke. Other examples of methods of producing colored contact lenses are described in U.S. Pat. Nos. 3,679,504 to Wichterle, 5,018,849 to Su et al., 5,302,978 to Evans et al., 5,120,121 to Rawlings et al., and 5,166,122 to Rawlings, and European Patent Publication No. 0 472 496 A2.

FOCUS GROUP RESULTS

In focus group testing, consumers found the lens of the present invention at least comparable, and generally preferable, to other color lenses.

| Blue Lens | J | K | CT | I |
| --- | --- | --- | --- | --- |
| Preference | 2.9 | 2.1 | 2.0 | 3.0 |
| Natural | 2.9 | 2.3 | 2.0 | 2.9 |
| Best Pattern | 3.1 | 2.0 | 2.1 | 2.8 |

| Green Lens | J | K | CT | I |
| --- | --- | --- | --- | --- |
| Preference | 2.8 | 2.3 | 2.4 | 2.5 |
| Natural | 2.6 | 2.4 | 2.4 | 2.6 |
| Best Pattern | 2.6 | 2.1 | 2.6 | 2.6 |

The lenses were graded on a scale of 1 to 4 (four being most preferable). The tested lenses are as follows:

J Jahnke lens having two different colors according to U.S. Pat. No. 5,414,477

K Knapp lens according to U.S. Pat. No. 4,582,402 modified by a slightly higher dot density and a dark iris periphery CT Continuous transparent dot over the iris I Inventive pattern of FIG. 1.

The blue lens results demonstrate a slight preference for the inventive lens over the Jahnke lens. However, the consumers much preferred the inventive lens over the transparent dot, and the slightly modified Knapp lens. In the other categories, the inventive lens was comparable, or slightly less preferred than the Jahnke lens, but was much preferred over the other lenses.

For the green lens, the inventive lens was slightly less preferred than the Jahnke lens, and slightly more preferred than the other two. In the most Natural and Best Pattern categories, the inventive green lens was slightly more or comparably preferred to the other lenses.

Although the Jahnke lens performed well, it is a more difficult pattern to produce. One major drawback of the Jahnke lens is that it required more than one application of colors to the lens.

The lens of this invention works best for enhancing the natural color of the eye, such as by adding shading or complementary colors to the natural eye color. It is also useful for less dramatic changes in color, such as from green to blue or vice versa. Although the lenses produce less effective results when substantial changes in eye color are desired, such as from brown to blue or vice versa, such changes are within the embodiment of the present invention.

The described embodiments are to be considered in all respects only as illustrative and not restrictive, and the scope of the invention, therefore, is indicated by the appended claims rather than by the foregoing description. All changes which come within the meaning and range of equivalency of the claims are to be embraced within their scope.

We claim:

1. A colored contact lens having a non-opaque pupil section and an iris pattern of color elements, wherein the pattern comprises:

a) an inner annular region;

b) an intermediate annular region constituting between about 25–72% of the total area of the iris pattern, the intermediate region having a population of color elements covering between about 5–30% of the intermediate region, said color elements forming an array of substantially radial macro-striations that alternate between macro-striations with color elements and macro-striations without color elements; and c) an outer annular region;

wherein the inner and outer regions do not contain radial macro-striations, said inner and outer regions each provide a population of color elements effective to enhance or modify the wearer's eye color as observed by an ordinary viewer.

2. The lens of claim 1 wherein the array has an irregular pattern.

3. The lens of claim 1 wherein the array has a regular pattern.

4. The lens of claim 1 wherein the intermediate region constitutes between about 30–60% of the area of the iris pattern.

5. The lens of claim 1 wherein the intermediate region constitutes about 47% of the area of the iris pattern.

6. The lens of claim 1 wherein the area covered by the color elements in the intermediate region is between about 10–20% of the intermediate region.

7. The lens of claim 1 wherein the area covered by the color elements in the intermediate region is about 15% of the intermediate region.

8. The lens of claim 1 wherein the respective borders between the inner and intermediate regions, and the outer and intermediate regions, are both substantially smooth, circular curves.

9. The lens of claim 1 wherein a jagged border is formed between the inner and intermediate regions.

10. The lens of claim 1 wherein a jagged border is formed between the intermediate and outer regions.

11. The lens of claim 1 wherein a jagged first border is formed between the inner and intermediate regions and a jagged second border is formed between the intermediate and outer regions.

12. The lens of claim 11 wherein the jagged borders are irregular jagged patterns.

13. The lens of claim 11 wherein the jagged borders are repetitive jagged patterns.

14. The lens of claim 11 wherein the intermediate region is defined by an average inner radius of between about 3.3–3.7 mm, and an average outer radius of between about 4.8–5.2 mm.

15. The lens of claim 11 wherein the intermediate region is defined by an average inner radius of about 3.5 mm, and an average outer radius of about 5.0 mm.

16. The lens of claim 1 wherein the color elements are applied on the anterior surface of the lens.

17. The lens of claim 1 wherein the color elements in the inner and outer regions form a grid.

18. The lens of claim 1 wherein the color elements are selected from the group consisting of circular dots, hexagonal dots and square dots.

19. The lens of claim 1 wherein the color elements can vary in shape and size.

20. The lens of claim 1 wherein each color element is the same color.

21. The lens of claim 1 wherein the color elements comprise at least two different colors.

22. The lens of claim 1 wherein the color elements are opaque.

23. The lens of claim 1 wherein the color elements are non-opaque.

24. The lens of claim 21 wherein at least one color element is opaque, and the another color element is non-opaque.

25. The lens of claim 1 wherein the density of the color elements of the inner region is varied to mimic the iris.

26. The lens of claim 1 wherein the density of the color elements of the outer region is varied to mimic the iris.

27. The lens of claim 1 wherein the densities of the color elements of the inner and outer regions are varied to mimic the iris.

28. The lens of claim 1 wherein the area covered by the color elements in the inner region is about 35–85%.

29. The lens of claim 1 wherein the area covered by the color elements in the outer region is about 35–85%.

30. The lens of claim 1 wherein the area covered by the color elements in both the inner and outer regions is about 35–85% each.

31. The lens of claim 1 wherein the area covered by the color elements in the inner region is about 40–50%.

32. The lens of claim 1 wherein the area covered by the color elements in the outer region is about 40–50%.

33. The lens of claim 1 wherein the area covered by the color elements in both the inner and outer regions is about 40–50% each.

* * * * *